(12) United States Patent
Ferguson

(10) Patent No.: US 10,542,146 B2
(45) Date of Patent: Jan. 21, 2020

(54) NEXT GENERATION EMERGENCY CALL ROUTING OVER DIVERSE NETWORKS

(71) Applicant: Donald Lee Ferguson, Los Angeles, CA (US)

(72) Inventor: Donald Lee Ferguson, Los Angeles, CA (US)

( * ) Notice: Subject to any disclaimer, the term of this patent is extended or adjusted under 35 U.S.C. 154(b) by 0 days.

(21) Appl. No.: 15/702,905

(22) Filed: Sep. 13, 2017

(65) Prior Publication Data
US 2018/0077283 A1 Mar. 15, 2018

Related U.S. Application Data

(60) Provisional application No. 62/495,369, filed on Sep. 13, 2016.

(51) Int. Cl.
| | |
|---|---|
| *H04M 3/51* | (2006.01) |
| *H04W 4/90* | (2018.01) |
| *H04W 4/029* | (2018.01) |
| *H04W 4/02* | (2018.01) |

(52) U.S. Cl.
CPC ........... *H04M 3/5116* (2013.01); *H04W 4/02* (2013.01); *H04W 4/029* (2018.02); *H04W 4/90* (2018.02); *H04M 2242/04* (2013.01); *H04M 2242/30* (2013.01); *H04Q 2213/1337* (2013.01)

(58) Field of Classification Search
CPC ............. H04M 3/5116; H04M 7/0075; H04M 2242/04; H04M 2242/30; H04W 4/90; H04W 4/02; H04W 76/50; H04W 40/00
See application file for complete search history.

(56) References Cited

U.S. PATENT DOCUMENTS

| | | | |
|---|---|---|---|
| 2003/0109245 A1* | 6/2003 | McCalmont | H04L 12/66 379/45 |
| 2004/0184584 A1 | 9/2004 | McCalmont et al. | |
| 2005/0213716 A1* | 9/2005 | Zhu | H04L 29/06027 379/45 |
| 2005/0220288 A1 | 10/2005 | Huey | |
| 2009/0016517 A1* | 1/2009 | Emmanuel | H04M 3/5116 379/207.12 |
| 2009/0291663 A1* | 11/2009 | Schultz | H04M 3/465 455/404.2 |
| 2010/0233991 A1* | 9/2010 | Crawford | H04W 4/90 455/404.1 |
| 2014/0376414 A1 | 12/2014 | Edge et al. | |
| 2015/0237469 A1* | 8/2015 | Stephens | H04L 65/10 455/404.2 |

(Continued)

FOREIGN PATENT DOCUMENTS

| | | |
|---|---|---|
| EP | 0995323 | 2/2006 |
| KR | 1020060119105 | 11/2006 |

OTHER PUBLICATIONS

International Search Report for PCT/US2017/051264 dated Dec. 26, 2017 (5 pages).

(Continued)

*Primary Examiner* — Magdi Elhag
(74) *Attorney, Agent, or Firm* — Tutunjian & Bitetto, P.C.

(57) ABSTRACT

Methods and systems for routing calls include determining location information identifying a location of a caller. A destination for a call from the caller is determined based on the location information and a geographic service area of the destination. The call is routed to the destination.

17 Claims, 4 Drawing Sheets

(56) References Cited

U.S. PATENT DOCUMENTS

| | | | |
|---|---|---|---|
| 2016/0104451 A1* | 4/2016 | Sahin | G06F 1/163 |
| | | | 345/519 |
| 2016/0379470 A1* | 12/2016 | Shurtz | H04W 4/90 |
| | | | 455/404.2 |
| 2017/0094488 A1* | 3/2017 | Grice | H04W 4/90 |
| 2018/0063323 A1* | 3/2018 | Nelson | H04M 3/42357 |

OTHER PUBLICATIONS

G. Klyne et al., Common Presence and Instant Messaging (CPIM): Message Format, Network Working Group, IHTFP Consulting, Aug. 2004.

E. Burger et al., Instant Message Disposition Notification (IMDN), Network Working Group, Ericcson Australia, Feb. 2009.

* cited by examiner

NEXT GENERATION EMERGENCY CALL ROUTING OVER DIVERSE NETWORKS

CROSS-REFERENCE TO RELATED APPLICATIONS

This application claims the benefit of U.S. Provisional Application Ser. No. 62/495,369, filed Sep. 13, 2016, which is incorporated by reference herein in its entirety.

TECHNICAL FIELD

The present invention generally relates to the routing of emergency information over diverse networks and, more specifically, to routing calls, text, and other media over a variety of different networks in a dynamic fashion that provides incremental migration from existing technologies.

BACKGROUND

The implementation emergency calling is antiquated, with many jurisdictions being limited to telephone calls to an emergency number (such as 911) and sometimes limited Short Message Service (SMS) text messages. Furthermore, the location-finding of existing technologies is limited, providing highly inaccurate location information in many cases. Citizens are increasingly interested in connecting to emergency services over a variety of media, including voice communications, text messages, internet messages (e.g., email), and video communications.

Transitioning to newer technologies for emergency services is challenging, however. Traditional telecommunication providers have been unable to ensure reliable delivery of citizens' requests for emergency services over a variety of telecommunications services. There are many telecommunication providers providing a variety of services through diverse partners, each with its own unique set of capabilities, implementations, and contractual obligations. This diversity makes an ad hoc system difficult to implement. Furthermore, even if one telecommunication provider were to implement such a system, it would not necessarily be available through other providers.

SUMMARY

A method for routing calls includes determining location information identifying a location of a caller. A destination for a call from the caller is determined based on the location information and a geographic service area of the destination. The call is routed to the destination.

A method for routing calls includes determining location information identifying a location of a caller. An emergency service dispatcher for a call for emergency services from the caller is determined based on the location information and a geographic service area of the emergency services dispatcher. The call is routed to a fallback destination if the location information cannot be determined or if there is no emergency services dispatcher that has a geographic service area that includes the location of the caller. The call is routed to the emergency services dispatcher over an emergency services IP network if the location information can be determined and there is an emergency services dispatcher that has a geographic service area that includes the location of the caller.

A call routing system includes an incoming interface configured to receive a call from a caller through a communication service provider. An outgoing interface is configured to send the call to a network having one or more call destinations. A location module is configured to determine location information identifying a location of the caller. A routing module that has a processor is configured to determine a destination for the call based on the location information and a geographic service area of the destination and routing the call to the destination using the outgoing interface.

BRIEF DESCRIPTION OF THE DRAWINGS

The teachings of the present invention can be readily understood by considering the following detailed description in conjunction with the accompanying drawings, in which.

Figure 1:
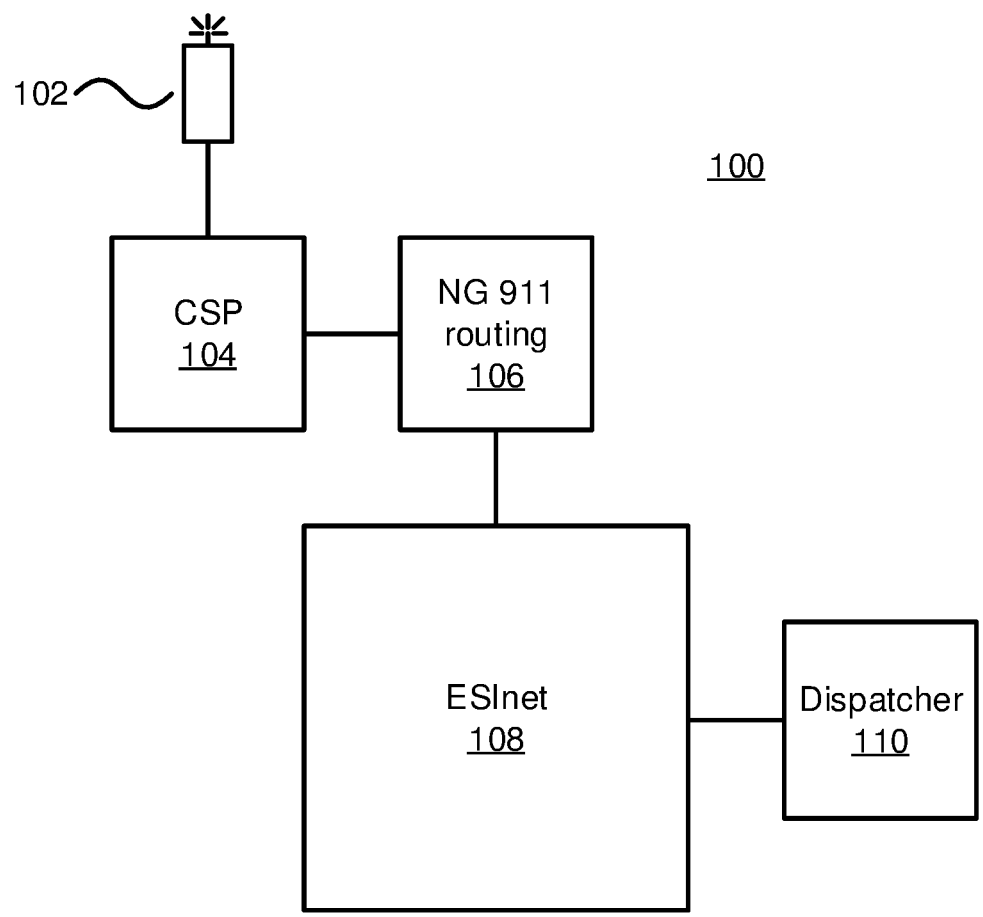
FIG. 1 is a block diagram of an emergency services call routing system in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF PREFERRED EMBODIMENTS

Embodiments of the present invention provide next generation emergency calling services to citizens whereby any communication service provider (CSP) can connect their services to a network that can reliably deliver a citizen's request for emergency services to the appropriate call center, regardless of the CSP's network configuration, the request's media type, or the user's originating device.

Referring now to FIG. 1, an exemplary emergency communication system 100 is shown. A user makes an emergency call using, for example, a mobile device 102. It should be understood that the use of a mobile device is intended to be purely exemplary and that any other communications means may be used instead, including for example a landline telephone, a desktop or portable computer, an appropriate radio service, a watch, a pendant, a satellite communication service, and emergency services kiosks.

Furthermore, it should be understood that the "call" need not simply be voice information, but may include text, video, and biometric information. For example, an emergency call could be made from a wearable device that measures heart rate, blood sugar, blood oxygen levels, or any of a variety of other biometrics. This information can be transmitted instead of, or in addition to, other types of media. Furthermore, different media can be directed to different recipients, for example with biometric information being sent directly to a doctor while the voice component gets sent to a dispatcher.

The user's device 102 interfaces with a CSP 104. In this particular example, the CSP 104 may represent a cellular or digital telephone service provider, but it should be understood that the CSP 104 may be any organization that provides communication services to its citizens including, for example, internet service providers, landline telephone providers, radio relay providers, satellite communication providers, voice over IP providers, etc. It should be noted that the term IP stands for "internet protocol" and is a general term that encompasses many forms of computer networking.

More specifically, the CSP's network configuration could include 2G, 3G, 4G, voice over long term evolution (VoLTE), TCP/IP, etc. and the media type could include, voice, SMS, instant messages, video, etc. The CSP 104 accepts the call (or message) from the user's device 102 and recognizes the call as being directed to emergency services. In one specific embodiment the call may be a 911 call, but it should be understood that other emergency service systems and communications media are contemplated.

The CSP 104 then interfaces with next generation emergency services (NG911) routing system 106. The NG911 routing system 106 provides a flexible interface to CSPs 104 using a standard application programming interface (API) for all types of communication. This allows the CSP 104 to perform whatever internal technical handling may be needed for the call and output a simple set of information about the call that NG911 routing system 106 uses to ensure that the call is routed to the appropriate place. The NG911 system 106 detects the media type of the call (e.g., voice, SMS, IP messaging, video, etc.) and provides a route through the an emergency service IP network (ESInet) 108 to a dispatcher 110 that can handle the user's media type.

One particular service that is managed by the NG911 routing system 106 is to acquire and verify user location information. Because user location is so important to providing timely and effective emergency services, different sources may be used, depending on the type of user device 102 and the type of call, to pinpoint the user's physical location. This location information is used to determine the closest dispatcher 110 to the user for routing purposes. Additional detail regarding the acquisition of location information will be provided below.

The NG911 routing system 106 interfaces with, e.g., an ESInet 108. The term ESInet is a general description of a communications network that is used for emergency services communications. ESInets are generally resilient against disruption and highly redundant, providing uptime guarantees of 99.999% or higher. There is no single specification for ESInets, and it should be understood that any appropriate communications network may be used instead. It should also be understood that less resilient communications networks may be used instead, including for example the Internet, thereby providing a wide variety of options for communicating with dispatchers.

In many cases, traditional ESInets are based on hardwired, voice-only circuits. It is specifically contemplated herein that such traditional ESInets may be used, but also that more modern services that employ IP or other networking protocols to dynamically route a wide variety of information types may be used instead of, or in addition to, traditional ESInets. In cases where traditional ESInets are accessed, the NG911 routing system 106 can translate from other call media into an analog voice signal. For example, if a digital voice over IP call is received, the NG911 routing system can convert this call to analog voice signals for transmission over a traditional ESInet.

The call is passed to the ESInet 108 with routing information determined by the NG911 routing system 106. The NG911 determines and provides both an entry route and an ESInet route, the former of which validates and authenticates access to the ESInet 108 and provides failover routes, while the latter further qualifies the incoming media and determines media handling and location handling logic. The ESInet uses this routing information to connect the call, or pass the message, to a dispatcher 110 (sometimes referred to as a public-safety answering point or PSAP).

The dispatcher 110 optionally communicates with the user 102 to determine the nature of the emergency, to further verify the location information, and to provide any information to the user 102 that may be needed. The dispatcher 110 communicates with an emergency service provider (e.g., police, fire, ambulance, etc.), providing the information from the call and the user's location.

Although the system 100 shown in FIG. 1 is made simple for the purpose of illustration, it should be understood that a realistic system may include many user devices 102 for each CSP 104, many different CSPs 104 using different technologies and communications standards, different ESInets 108 for different regions, and multiple different dispatchers 110 for different types of emergency service. The 911 NG routing system 106 provides a single interface to all of these different uses, seamlessly and dynamically forwarding users' calls to the appropriate destination, regardless of the type of media or technology being employed. Any CSP 104, providing any kind of communications service to its users 102, can interface with the NG911 routing system 106 to provide emergency services to their users 102 without having to independently create the interface with the ESInet 108.

In one example of how the system 100 can be used with more complicated topologies, the NG911 routing system 106 can establish connections with multiple dispatchers 110 over multiple communications media simultaneously for a single call. Thus multiple dispatchers 110 can receive updates over voice, video, or textual media and dispatchers 110 can be added or removed from the call at any time.

The CSP 104 forwards calls to the NG911 routing system 106 using, for example, a website, portal, or dedicated API. The NG911 routing system 106 may maintain information regarding each CSP 104 locally, including geographical location, types of media provided by the CSP 104, services provided by the CSP 104, and any technical, legal, or contractual requirements the CSP 104 may have. This information may include a default entry route, or the CSP 104 may provide entry route information with each call.

An exemplary entry route schema includes fields for <id>, <user_id>, <entry>, <description>, <direct_route>, and <location_failure_route>. The <user_id> field identifies the particular CSP 104 with a unique identification number that is stored at the NG911 routing system 106. The purpose of the entry route is to authenticate requests for emergency services, to fully qualify and characterize an inbound request for emergency services, and to ensure that every request for emergency services gets routed to some form of call handler, regardless of media type. Every CSP 104 that provides some form of communication service to its users provides one or more entry routes to help manage emergency services for its users.

The <id> field represents a unique identifier for a given entry route. The NG911 routing system 106 may have many entry routes for respective CSPs 104, and in some cases may have multiple entry routes for each CSP 104.

The <entry> field identifies entry route characteristics that describe the route by which the CSP 104 accesses the ESInet 108. The <entry> field may therefore include information regarding an internet address, communications technology, communications medium, etc. The <entry> field thereby provides access to the entry route and may include, e.g., a phone number or a setting in a header of a voice, video, or IP message.

The <description> field is a human-readable description provided by the CSP 104 for the entry route.

The <direct_route> field is a directive to the entry route in question to skip intermediate location and subscriber lookup operations and to route the call directly to the endpoint. This field may be used, for example, for administrative or management lines that are not themselves calling for emergency assistance.

The <location_failure_route> field may be used to indicate an alternative route for the case where the NG911 routing system 106 cannot retrieve a location for the user 102, or finds a location that cannot be served by an appropriate dispatcher 110. In one example, the <location_failure_route> may indicate a fallback 911 call center. It should be understood that it is a goal of the present embodiments to make such failures rare, and so the use of a fallback route should trigger logging to identify when the failure occurred and the circumstances of the failure and should notify the CSP 104 and any appropriate contact for the emergency service in question.

Assuming the call path has not been redirected by the <direct_route> field in the entry route, the NG911 routing system 106 queries an ESInet route for additional routing information. The ESInet route may include fields such as <id>, <user_id>, <name>, <esinet_id>, <esinet_media_id>, <esinet_jurisdiction_id>, <esinet_entry_route_id>, <esinet_route_location_acquisition_rule_id>, <status>, <location_callback_function>, <location_callback_function_maximum_wait_seconds>, <subscriber_address_callback_function>, <subscriber_name_callback_function>, and <incident_additional_information_callback_function>. The ESInet route information is set by a CSP 104 to establish how that particular CSP will further qualify a request for emergency services. ESInet routes provide additional routing instructions to a request regardless if that request has originated as voice, video, or textual information. After the call has been authenticated, qualified, and characterized by the entry route, the ESInet route further handles the call to ensure delivery to a dispatcher 110.

The information in the ESInet route is selected based on its association with an entry route and based on the inbound media type. Once the route is identified, the best location acquisition method for the user 102 is selected. Additional information about the user 102 can be bundled with the call as well, such as the user's name, address, or information relating to the emergency incident.

The <user_id> field may again refer to the CSP's unique identification number, as set in the entry route information.

The <name> field identifies the name that the CSP 104 has identified with the route.

The <esinet_id> field is an identifier for the particular ESInet 108 that the route belongs to. As noted above, there may be many different ESInets 108 that interface with the NG911 routing system 106.

The <esinet_media_id> field designates the type of media that is delivered by the CSP 104 on the route. The media type (e.g., voice, text, video, etc.) affects media delivery rules. While most dispatchers 110 are capable of handling voice information, many are only able to handle communications through telephone company circuits, not IP voice communication. Furthermore, dispatchers 110 are not frequently capable of handling video or SMS or instant message text information. As dispatchers 110 continue to implement more modern communication technologies, this field allows the NG911 routing system 106 to select dispatchers 110 that are capable of receiving the message.

The <esinet_jurisdiction_id> field optionally allows CSPs 104 to create routes that forward calls directly to a jurisdiction. In some embodiments, the "jurisdictions" may refer to emergency services call centers (e.g., 911 call centers). A given geographic region may be divided into jurisdiction, with various call centers sharing the responsibility of handling calls in the region. Most inbound calls requesting emergency services are routed based on the location of the caller and the jurisdiction serviced by the call center. However, there are cases where a particular ESInet route may direct the call to a specific destination, overriding the caller's location. The <esinet_jurisdiction_field> is used for this case, to direct the call to a specific destination.

The <esinet_entry_route_id> field specifies the identifier of a specific entry route. Every ESInet route should be associated with at least one entry route.

The <esinet_route_location_acquisition_rule_id> field is used to designate the type of location acquisition rule that will be used to determine the user's location, if the location is not included with the call. Exemplary options for this field include "landline," "wireless sector," "wireless IP," "voice over IP," "IP," and "SMS."

The <status> field provides the status of the route, with exemplary options for the field including "develop," "test," "stage," and "live." It should be noted that only live routes should be used to route actual emergency calls.

The <location_callback_function> field is used to locate the user 102 by latitude and longitude. When location is not included with the call, the NG911 routing system 106 will use a location callback function provided by the CSP 104 to retrieve location information from the CSP's designated API endpoint.

The <location_callback_function_maximum_wait_seconds> field designates how long the NG911 routing system 106 should wait to receive user location information before it falls back to the <location_failure_route>. As noted above, the NG911 routing system 106 will automatically notify the CSP 104 and a contact at the pertinent emergency service of this type of failure so that corrective action can be taken.

The <subscriber_address_callback_function> field is used for the user's physical address. When the user's physical address is not included with the call, the NG911 routing system 106 will use an address callback function provided by the CSP 104 to retrieve the user's physical address. Physical addresses can be provided by some landline service providers as well as some voice over IP service providers.

The <subscriber_name_callback_function> field is used to retrieve the name of the user. When the user's name is not included with the call, the NG911 routing system 106 will use a subscriber name callback function provided by the CSP 104 to retrieve the user's name. The call should not be delayed while waiting to retrieve a user's name, but a failure of the callback function may be reported to both the CSP 104 and the contact for the emergency service.

The <subscriber_additional_information_callback_function> field is used to retrieve any additional information that may be available regarding the user's situation. When additional information is not included with the call, the NG911 routing system 106 will use an additional information callback function provided by the CSP 104 to retrieve such information. The call should not be delayed while waiting to retrieve additional information, but a failure of the callback function may be reported to both the CSP 104 and the contact for the emergency service.

Figure 2:
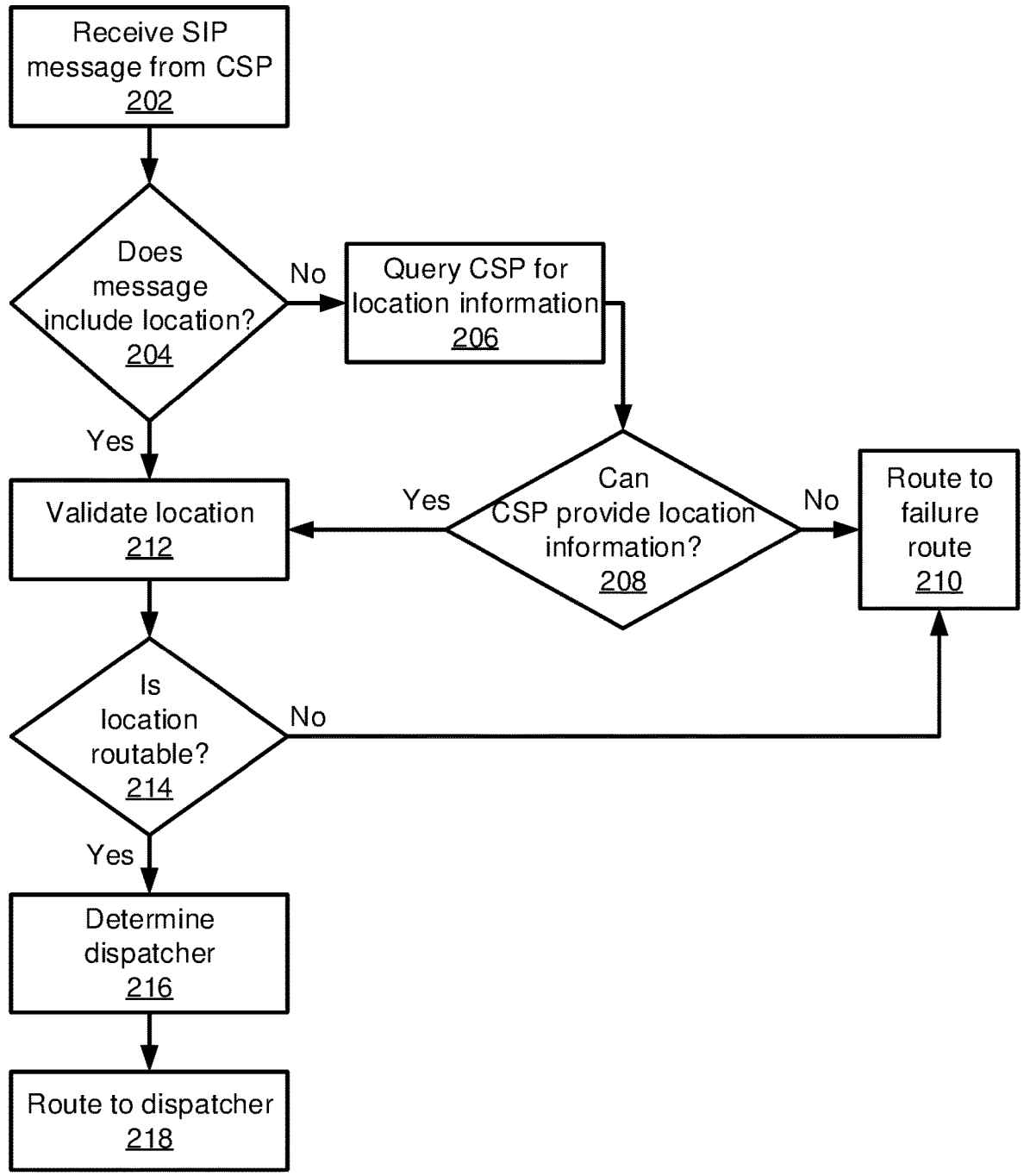
FIG. 2 is a block/flow diagram of a method for emergency services call routing in accordance with an embodiment of the present invention.

Referring now to FIG. 2, a method for emergency call handing is shown. Block 202 receives an initiating message using, e.g., the session initiation protocol (SIP), from the CSP 104 to initiate the emergency call. As noted above, this may reflect any sort of emergency communication from any of a variety of different types of CSP 104. Block 204 then determines if the initiating message itself includes location information for the user 102.

If the initiating message does not include location information, block 206 queries the CSP 104 using the provided location callback function. Block 208 then determines whether the CSP 104 has provided suitable location information. If not, block 210 routes the call on the failure route defined by the entry route. If the initiating message includes the location information, or if the CSP provides the location information, block 212 performs location validation.

Once the location has been validated, block 214 determines whether the call can be routed to an appropriate dispatcher 110. If not, block 210 routes to the failure route. If so, block 216 determines the dispatcher 110 that is closest to the user 102 and block 218 routes the call and any other information that has been collected to the dispatcher 110.

The location validation of block 212 can take any of several forms, according to the type and medium of the call. Location validation can make use of a variety of information sources including, e.g., postal service databases, phonebook databases, CSP-provided subscriber address databases, CSP-provided tower location databases, etc. Block 212 determines, based on the type and medium of the call, how precise the associated location information can be.

For example, if the call originates from a landline with a fixed address, the landline's location may be validated as a street address. If the call originates from a wireless device (e.g., a mobile phone), then a longitude or latitude provided is only validated as referring to the location of the cell tower, with the possible inclusion of the cell sector. If the call originates from a wireless internet device (e.g., through a home wireless local area network connection), then the location may be validated as a latitude and longitude. If the call originates from a voice over IP service, the location may be validated as either a street address or as a latitude and longitude. If the call originates from an IP service (e.g., email or some other IP network-bound communication), then the location may be validated as the latitude and longitude of the subscriber. If a message originates as an SMS text message, then the message may be validated as an address of a wireless tower and a cell sector.

The question of validation is tied together with the question of whether a call is routable. For example, a call location that is validated as coming from a particular IP address may not be routable to an appropriate dispatcher 110. This may be due to the fact that the geographic area encompassed by the possible locations with the IP address is so large that an appropriate dispatcher 110 cannot be determined or may be due to the impracticality of locating the user within that area. An exemplary list address types that can be properly routed includes static subscriber addresses, static cell antenna addresses, static cell antenna latitude/longitude coordinates, and actual subscriber latitude/longitude coordinates. Thus, if for example a landline call comes in with a static subscriber address, no location update is needed. However, wireless or IP calls may need further location information before the call can be properly routed to a dispatcher 110.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
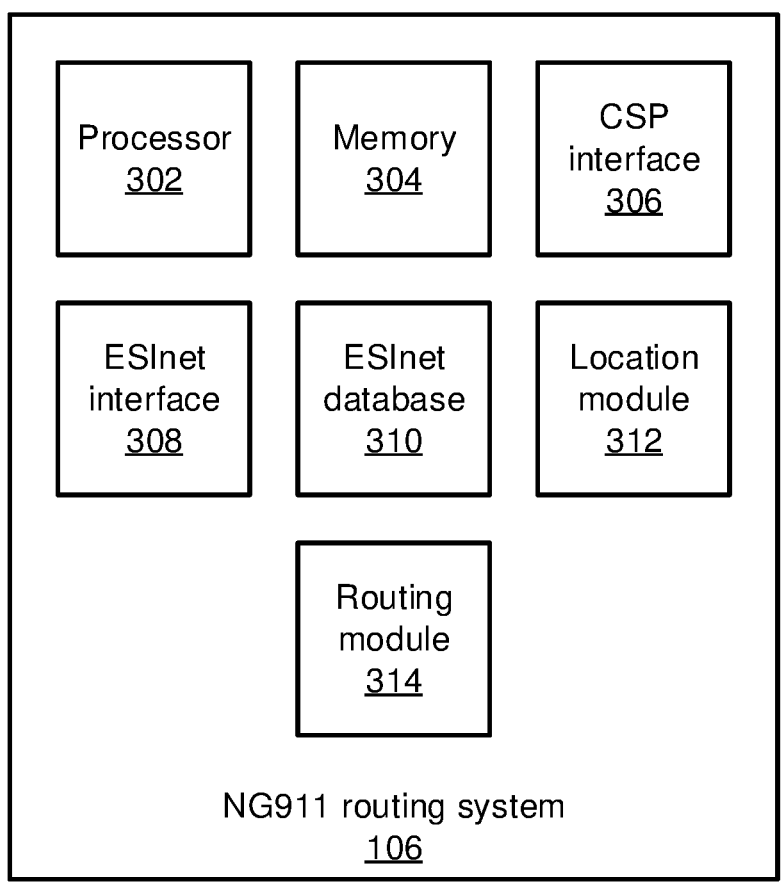
FIG. 3 is a block diagram of a next-generation emergency services call routing system in accordance with an embodiment of the present invention.

Referring now to FIG. 3, a block diagram of the NG911 routing system 106 is shown. The NG911 routing system 106 includes a hardware processor 302 and memory 304. The routing system 106 also includes one or more functional modules that may, in some embodiments be implemented as software that is executed in the processor 302 and stored in the memory 304. In alternative embodiments, the functional modules may be implemented as one or more discrete hardware components in the form of, e.g., application specific integrated chips and field programmable gate arrays.

The routing system 106 includes a CSP interface 306 and an ESInet interface 308. Each interface includes a hardware communications interface that may include any appropriate communications mechanism including, e.g., a wired or wireless network interface. The CSP interface 306 communicates with CSP 104, receiving call information from a user 102. The CSP interface 306 furthermore sends queries back to the CSP 104, acquiring information relating to the user's location and any other pertinent data using callback functions provided by the CSP 104. The ESInet interface 308 sends the call to an appropriate dispatcher 110 through the ESInet 108. It should be understood that the CSP interface 306 may communicate with multiple CSPs 104 and that the ESInet interface 308 may communicate with multiple ESInets 108. Indeed, it is specifically contemplated that the NG911 routing system may serve many CSPs 104 and many ESInets 108, providing a standard gateway for the users of different CSPs 104 to access any needed ESInet 108.

The NG911 includes an ESInet database 310 that includes information regarding ESInet routing protocols and the dispatchers 110 that are served thereby. The ESInet database 310 in particular includes information relating to the nature of the services provided by the dispatchers 110, the geographic area serviced by the dispatchers 110, and any technical routing information needed to reach each dispatcher 110 through the ESInet(s) 108.

A location module 312 acquires and verifies location information for each calling user 102. If the initial information provided by the CSP 104 does not include location information, the location module 312 may query the CSP 104 via the CSP interface module 306 using the CSP-provided location callback function to obtain such information. The location module 312 furthermore assesses the call, determining the precision of the location based on the type of call. For example, unless explicit GPS information is provided, a call from a mobile telephone can often only be traced to the closest tower that is serving the call.

A routing module 314 analyzes the call received by the CSP interface module 306 and uses the location information provided by the location module 312 to determine a dispatcher 110 in the ESInet database 310. The routing module 314 then routes the call through the ESInet interface module 308 to the appropriate ESInet 108 with routing information to read the appropriate dispatcher 110. It should also be noted that the routing module 314 provides fallback routing in the event that the location module 312 is unable to acquire or validate usable location information for the user. In this case, the routing module 314 provides routing according to the <location_failure_route> stored in the pertinent entry route entry of the ESInet database 310.

In some embodiments, the routing module 314 may route the call, or parts of the call, to multiple different destinations. For example, an emergency call that includes both voice and biometric information may be routed to an emergency dispatcher and directly to medical professionals. Thus, a diagnosis may be possible immediately (e.g., in the case of a heart attack) and the emergency services that are dispatched can be properly equipped and informed. Thus the routing module 314 considers the type of media making up the call, with exemplary media including voice data, SMS text messaging, instant messaging, video data, and biometric data.

Figure 4:
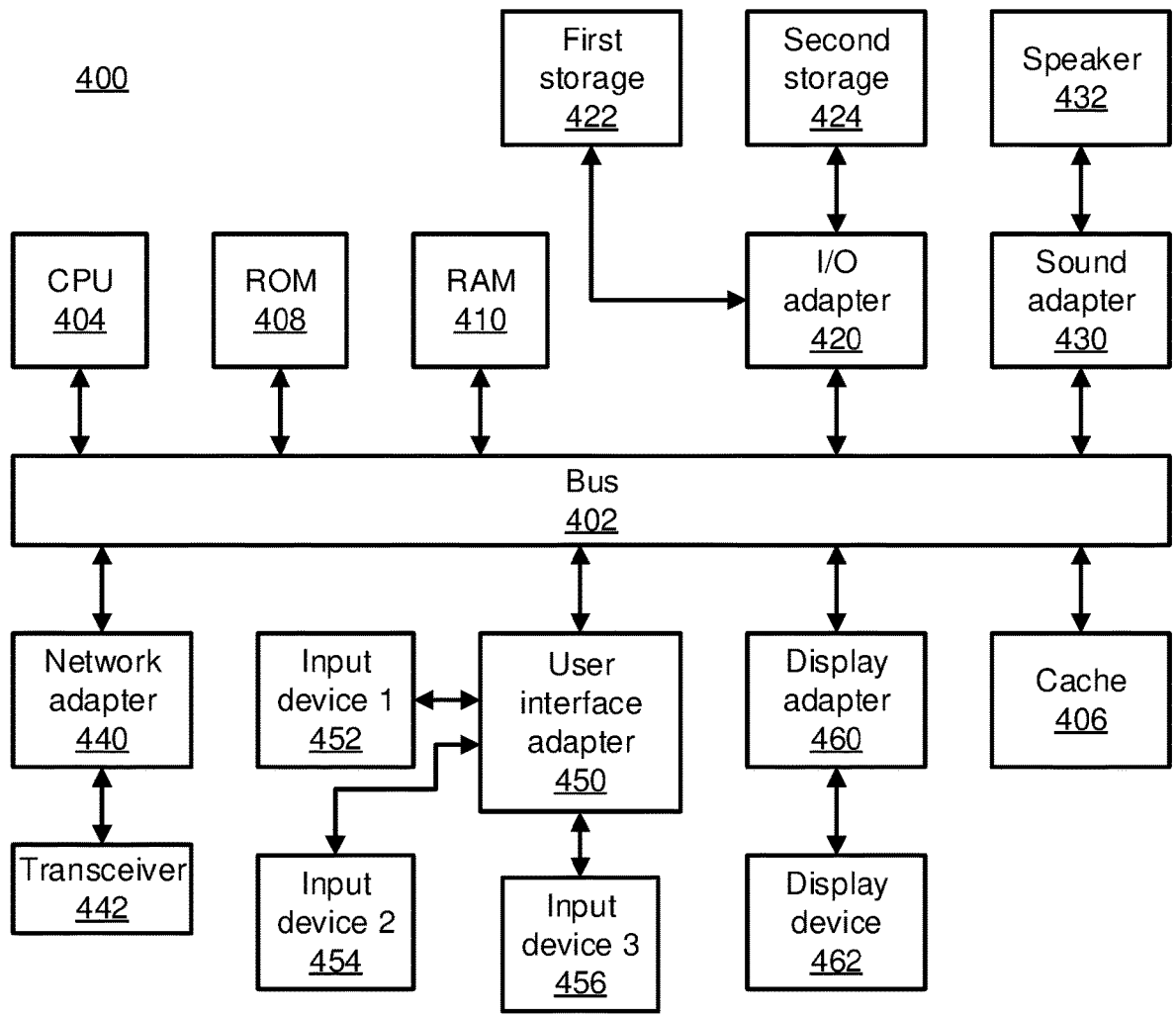
FIG. 4 is a block diagram of a processing system in accordance with an embodiment of the present invention.

Referring now to FIG. 4, an exemplary processing system 400 is shown which may represent the NG911 routing system 106. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles.

The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A method for routing calls, comprising:
   determining location information identifying a location of a caller;
   determining a plurality of media types within a call from the caller;
   determining a plurality of emergency service providers for a call from the caller based on the location information, a geographic service area of the emergency service providers, and the determined plurality of media types; and
   routing the call to the emergency service providers, with different subsets of data within the call, corresponding to respective determined media types, being routed to different emergency service providers from the determined plurality of emergency service providers.

2. The method of claim 1, further comprising validating the location information based on an originating medium of the call.

3. The method of claim 2, wherein validating the location information comprises determining the originating medium of the call and determining a level of location precision that can be associated with the originating medium.

4. The method of claim 1, wherein determining location information comprises querying a communication service provider that originated the call.

5. The method of claim 1, further comprising routing the call to a fallback emergency service dispatcher if the location information cannot be determined or if there is no emergency service provider that has a geographic service area that includes the location of the caller.

6. The method of claim 1, wherein routing the call to the emergency service providers comprises routing call contents and the location information to the emergency service providers.

7. The method of claim 1, wherein the call is a call for emergency services and wherein routing the call to the emergency service providers comprises routing the call over an emergency services IP network.

8. The method of claim 1, wherein the plurality of media types include voice information and biometric information and wherein the voice information is routed to an emergency service dispatcher and the biometric information is routed to a doctor.

9. A non-transitory computer readable storage medium comprising a computer readable program for routing calls, wherein the computer readable program when executed on a computer causes the computer to perform the steps of:
   determining location information identifying a location of a caller;
   determining a plurality of media types within a call from the caller;
   determining a plurality of emergency service providers for a call from the caller based on the location information, a geographic service area of the emergency service providers, and the determined plurality of media types; and
   routing the call to the emergency service providers, with different subsets of data within the call, corresponding to respective determined media types, being routed to different emergency service providers from the determined plurality of emergency service providers.

10. A call routing system, comprising:
    an incoming interface configured to receive a call from a caller through a communication service provider;
    an outgoing interface configured to send the call to a network having one or more call destinations;
    a location module configured to determine location information identifying a location of the caller;
    a routing module comprising a processor configured to determine a plurality of media types within the call, to determine a plurality of emergency service providers for the call based on the location information, a geographic service area of the emergency service providers, and the determined plurality of media types, and to route the call to the emergency service providers using the outgoing interface, with different subsets of data within the call, corresponding to respective determined media types, being routed to different emergency service providers from the determined plurality of emergency providers.

11. The system of claim 10, wherein the location module is further configured to validate the location information based on an originating medium of the call.

12. The system of claim 11, wherein the location module is further configured to determine the originating medium of the call and to determine a level of location precision that can be associated with the originating medium.

13. The system of claim 10, wherein the location module is further configured to query a communication service provider that originated the call using the incoming interface.

14. The system of claim 10, wherein the routing module is further configured to route the call to a fallback destination if the location information cannot be determined or if there is no destination that has a geographic service area that includes the location of the caller.

15. The system of claim 10, wherein the routing module is further configured to route call contents and the location information to the emergency service providers.

16. The system of claim 10, wherein the call is a call for emergency services and wherein the routing module is further configured to route the call over an emergency services IP network.

17. The system of claim 10, wherein the incoming interface is configured to receive calls from a plurality of communication service providers and wherein the outgoing interface module is configured to send calls to one or more of a plurality of networks.

* * * * *